United States Patent [19]
Brokaw et al.

[11] Patent Number: 5,658,086
[45] Date of Patent: Aug. 19, 1997

[54] FURNITURE CONNECTOR

[76] Inventors: Paul E. Brokaw, 250 E. 248, Euclid, Ohio 44123; John Spirk, 7890 Brigham Rd., Gates Mills, Ohio 44040; Robert G. Taylor, 8716 Priem Rd., Strongsville, Ohio 44136; Jeffrey M. Kalman, 1849 Cadwell Ave., Cleveland Heights, Ohio 44118

[21] Appl. No.: 562,411

[22] Filed: Nov. 24, 1995

[51] Int. Cl.$^6$ .................... F16B 12/04; F16B 12/26; F16B 12/44
[52] U.S. Cl. .................... 403/327; 403/326; 403/267; 403/265; 403/DIG. 7; 144/354
[58] Field of Search ................ 403/326, 327, 403/265–267, 292, 297, DIG. 7; 144/354, 351, 353

[56] References Cited

U.S. PATENT DOCUMENTS

| | | | |
|---|---|---|---|
| Re. 32,384 | 3/1987 | Burchett et al. | 403/297 X |
| 569,235 | 10/1896 | Rockwell | 403/265 |
| 653,328 | 7/1900 | Tyden | 403/292 |
| 1,516,975 | 11/1924 | McArthur | 403/266 X |
| 1,813,072 | 7/1931 | Murdock | 144/354 |
| 1,977,080 | 10/1934 | Newton | 144/353 X |
| 2,585,304 | 2/1952 | Evans et al. | 403/267 X |
| 2,678,853 | 5/1954 | Reeder | 403/265 X |
| 2,702,926 | 3/1955 | Rahaim | 403/265 X |
| 2,817,620 | 12/1957 | Golick et al. | 403/265 X |
| 3,059,291 | 10/1962 | Sherwood | 49/371 |
| 3,966,339 | 6/1976 | Nemecek et al. | 403/292 |
| 4,208,850 | 6/1980 | Collier | 52/285 |
| 4,565,392 | 1/1986 | Vyse | 285/23 |
| 4,681,477 | 7/1987 | Fischer | 403/298 |
| 4,797,021 | 1/1989 | Stamper | 403/407.1 |
| 4,802,700 | 2/1989 | Stevenson | 411/353 X |
| 5,131,783 | 7/1992 | Astl | 403/298 |
| 5,259,686 | 11/1993 | Hatch | 403/267 |
| 5,572,386 | 11/1996 | Ananth et al. | 360/103 |

FOREIGN PATENT DOCUMENTS 19932   8/1897   United Kingdom ................ 403/267

OTHER PUBLICATIONS

Brochure for The Accu–Pin, dated 1992.
Brochure for The Accu–Pin, dated 1993.
Instruction Manual for Bowback or Cottage Chair, dated Sep. 1990.

*Primary Examiner*—Anthony Knight
*Attorney, Agent, or Firm*—Vickers, Daniels & Young

[57] ABSTRACT

A connecting element for creating a blind side connection for materials such as furniture. Connecting element includes a tenon which includes a groove positioned about the peripheral surface of the tenon. A compression material which is flexible and has excellent memory is inserted into the group on the tenon. A mortise is provided which has an opening for telescopically receiving the tenon and compression material into the inner chamber of the mortise. The inner chamber includes a set slot positioned around the interior surface of the chamber and is designed to receive the peripheral edge of the compression material on the tenon. Liquid and/or re-wettable adhesives can be used to rigidly connect the tenon in the mortise.

76 Claims, 3 Drawing Sheets

FURNITURE CONNECTOR

The present invention relates to a connecting element and more particularly to a connecting element for connecting parts such as for furniture.

BACKGROUND OF THE INVENTION

There are many ways in which structures such as shelving, scaffolding, furniture, clipboards and cabinets are fitted together. Such arrangements include fasteners such as nuts and bolts, wooden dowels, nails and other types of intricate locking mechanisms. Dowels are the most common connectors of furniture. The dowel is typically symmetrical about its axial midpoint and is typically provided with one or more longitudinally extending grooves or some other type of profiling on the outside of the dowel. The dowel is typically inserted into a cylindrical bore drilled into the furniture part in which the dowel is to be connected therein. Adhesives are commonly placed into the central bore prior to insertion of the dowel so that an improved connection between the bore and dowel is made.

The preparation and construction of furniture requires special knowledge and special skills. Many types of furniture are not preassembled and are commonly transported to the location where they are to be assembled. During such transportation, many of the connection components are exposed to adverse types of environments such as low and high humidity which results in the cracking and/or expanding of the dowels. Such expanding and cracking of the dowels results in the weakening of the structure in which the dowel is connecting and/or resulting in the dowel not being able to be properly placed within the pre-drilled bore hole. In addition, special skill is required when inserting a dowel into a bore hole containing a liquid adhesive. In order to achieve an interference fit between the bore and the dowel, the diameter of the dowel is typically slightly greater than the diameter of the bore hole thereby requiring the dowel to be driven or pressed into the bore hole commonly resulting in much of the adhesive being forced out of the bore hole. In order to overcome the problems with using dowels and adhesives, many manufacturers have used screws or nails to attach components such as furniture together or to secure a dowel in position. Although the use of a screw or a nail typically provides an adequate connection, the aesthetic value of the component, such as fine furniture, is severely prejudiced due to the appearance of the visible nail or screw.

As is apparent, the use of a dowel in combination with an adhesive is time consuming and requires great care. Furthermore, soiling of the surfaces and parts commonly occurs with the use of liquid adhesives. Also, the amount of adhesive placed in the bore is important so as not to cause significant waste and cleaning problems when the dowel is inserted into the bore. The prior art includes several solutions to remedying the problem associated with dowels and liquid adhesives.

In U.S. Pat. No. 4,681,477, an enclosed capsule filled with a specific amount of adhesive is placed into the cylindrical bore prior to inserting the dowel into the bore. The premeasured amount of adhesive is designed to reduce the problems caused when the dowel is inserted into the bore, the adhesive flows out of the bore causing a mess. Furthermore, sealing the adhesive reduces problems associated with spillage of the adhesive onto the furniture. However, the use of a glue capsule does not insure that the glue uniformally coats the inserted dowel to insure that the dowel uniformally adheres to the bore. Furthermore, the use of a glue capsule still requires the assembler to carefully insert the dowel into the bore so that the dowel is properly aligned in the bore to rupture the glue capsule. In addition, the assembler does not have any indication when the dowel has been completely inserted into the bore. Finally, the use of the glue capsule does not allow the assembler to remove the dowel after complete insertion into the bore if any problems result in the initial insertion of the dowel since such removal would cause a mess and the glue in the bore and on the dowel would dry, thereby preventing reinsertion of the dowel into the bore.

In U.S. Pat. No. 5,259,686, a dowel is coated with a water soluble glue prior to inserting the dowel into the bore. Once the dowel is inserted into the bore, liquid is injected about the dowel and into the bore thereby activating the glue and creating a connection between the dowel and the cylindrical bore. The coating of the dowel with the water soluble glue assists in uniformly gluing the dowel to the cylindrical bore. The water soluble glue also reduces the problems associated with excess glue flowing out of the bore as the dowel is inserted. However, the use of such a dowel does not indicate to the assembler as to whether the dowel has been properly and completely inserted into the cylindrical bore. Such improper alignment of the dowel would require the assembler to drill out the rigidly connected dowel or have connected pieces improperly aligned. The dowel design also does not allow for intermediate assembly to ensure proper setup prior to final assembly. These problems become more severe when fine furniture is assembled which has very small tolerances and requires a precision connection. The dowel is also a typical interference fitting dowel. The tight fit of the dowel in the bore requires any water applied to the dowel and bore to slowly wick into the bore to re-wet the glue. However, improper re-wetting can occur if not enough water is applied and/or if the dowel is too tightly fitted in the bore thereby interfering with the wicking effect.

As a result, there has been a demand for a connector which forms a clean and secure connection, allows an assembler to assemble and disassemble parts as needed to fully assemble the components and to form a rigid and strong connection when the components are in their final assembled form.

SUMMARY OF THE INVENTION

The present invention relates to a connection device and method of making the same and more particularly to a connection connecting element for connecting furniture or similar articles together.

In accordance with the present invention, the connecting element includes a furniture piece having a tenon and a second furniture piece having a mortise. As will be appreciate, the tenon and mortise may be Used to connect other objects such as buildings, machinery, etc. The tenon is preferably part of a furniture piece attached to a furniture piece or a separate component. The tenon includes a leading edge, a front face and a peripheral surface. The cross-sectional design of the tenon may include a variety of shapes. Preferably, the tenon generally has a circular cross-sectional area of a given diameter which is generally uniform throughout the longitudinal axis of the tenon. The tenon also includes a groove circumferentally positioned about the parameter surface of the tenon. The groove is preferably uniformally spaced from the leading edge of the tenon. The groove has a depth which may be uniform or vary throughout the groove. The cross-sectional shape of the groove may be curvilinear, polygonal, or some other shape.

A compression material is positioned into the groove. The compression material preferably extends at least partially about the peripheral surface of the tenon. The compression material is preferably a flexible material with sufficient elasticity and memory to both move under pressure and to reposition itself in its original position once the force acting upon the compression material is reduced. The compression material protrudes from the groove. The cross sectional shape of the compression material can be wedged shaped, circular, semi-circular, or some other shape. Preferably, the compression material is circular in shape such as a circular ring or O-ring.

The mortise is designed to form a connection with the tenon and the compression material. The mortise includes an opening and an inner chamber. Preferably, the cross-sectional diameter of the inner chamber is generally uniform. The mortise opening and inner chamber preferably have a cross-sectional diameter which is equal to or greater than the cross-sectional diameter of the tenon so that the tenon can be telescopically inserted into the inner chamber of the mortise. The inner chamber can include a base. If the mortise includes a base, the connection between the tenon and mortise is a blind connection. The inner chamber includes an interior surface which preferably includes set slot positioned about the interior surface. The set slot is preferably positioned complete about the interior surface. The set slot has a depth which may be uniform or vary throughout the set slot. The cross-sectional shape of the set slot may be curvilinear, polygonal or some other shape. A connection is formed between the tenon and mortise by inserting the front face of the tenon into the inner chamber of the mortise. As the compression material on the tenon enters the inner chamber, the compression material is compressed by the walls of the inner chamber which creates a resistance to the tenon being inserted into the mortise. The compression material causes the tenon to be centered in the mortise inner chamber to evenly distribute the force on the compression material. This centering action ensures that the tenon is properly inserted in the mortise. The tenon is completely inserted into the mortise when the compression material at least partially enters the set slot of the mortise. The reduction of the force on the compression material as the compression material enters the set slot creates a tactual signal defined as an audible snapping sound Which signals the assembler that the tenon is completely inserted into the mortise.

In accordance with another aspect of the present invention, the set slot is uniformally spaced from the base of the mortise at some distance such that the distance is less than the distance between the leading edge and groove of the tenon. Such a space relationship results in the groove of the tenon and the set slot of the mortise to never come into full alignment when the tenon is completely inserted into the mortise. The spacing difference only allows the compression material to partially enter the set slot. This partial entering of the compression material into the set slot creates a force on the tenon which directs the tenon toward the base of the mortise thereby insuring that the tenon is maintained within the mortise during assembly.

In accordance with another aspect of the present invention, the compression material is a flexible material made of metal, rubber, and/or a plastic material. Preferably, the compression material is a material made from TEFLON, polyethylene or polypropylene. Such materials have excellent flexibility and memory to insure a proper connection between the tenon and mortise. The durameter of the material is also important to insure that the material is rigid enough to form a firm connection when the tenon is positioned completely in the mortise. A durameter value which is too low will allow the material to compress too easily thereby allowing the tenon to improperly move within the mortise and not be properly aligned. A durameter value which is too high will not properly flex and compress thereby potentially causing damage to the inner chamber of the mortise and/or compression material or preventing the tenon from being inserted into the mortise.

In accordance with another aspect of the present invention, the compression material has a circular or wedge shaped cross-sectional area. A circular cross-sectional shape which allows the compression material to move in and out of the set slot in the mortise regardless of the shape of the set slot. Such a cross-sectional shape allows an assembler to assemble and unassemble the connecting element as needed during assembly. The wedge shaped cross-section shape of the compression material is designed to move freely in and out of set slots in the mortise that are arcuate in shape and to lock into position in set slots having a flat surface within the set slot. The locking of the compression material in the flat surface occurs when the flat surface of the wedge expands into the set slot and positions itself adjacent to the flat surface of the set slot.

In accordance with another aspect of the present invention, the leading edge of the tenon and/or the opening of the mortise are bevelled. The bevelling of the leading edge and/or the opening facilitates in the insertion of the tenon into the mortise thereby providing for an easy connection between such components.

In accordance with still another aspect of the present invention, an adhesive is applied to the outer surface of the tenon and/or in the inner chamber of the mortise. The adhesive is used to form a rigid and strong connection between the mortise and the tenon. Preferably, the adhesive is a water soluble adhesive which is applied to both the tenon and to the mortise. The coating thickness of the water soluble adhesive is preferably thin so as not to increase the diameter of the tenon and/or reduce the diameter of the mortise such that the tenon can be no longer inserted into the mortise. The application of the adhesive to the tenon and mortise also produces a seal between the atmosphere and the exposed surfaces of the tenon and the mortise thereby preventing the tenon and mortise from drying out and cracking when exposed to low humidity and/or expanding or swelling when exposed to high humidity. If a water soluble adhesive is used, the water soluble adhesive is preferably a vinyl acetate derivative which when exposed to water is activated to form an adhesive surface.

In accordance with another aspect of the present invention, the inner chamber of the mortise includes one or more side slots. Preferably, the side slot extends longitudinally from the set slot to the opening of the mortise. The side slot provides an access for liquid to enter into the inner chamber of the mortise when the tenon is inserted in the mortise so that the liquid can activate the liquid soluble glue on the tenon and/or mortise. The side slot facilitates in the wicking of the liquid applied at the opening of the mortise to cause the liquid to better seep into the inner chamber and activate the liquid soluble adhesive. One or more side slots may be provided in the inner chamber to increase the wicking action of the liquid into the chamber.

In accordance with another aspect of the present invention, the mortise includes a secondary slot in the inner chamber. The secondary slot is spaced between the opening of the mortise and the set slot. Preferably, the secondary slot is evenly spaced between the mortise opening and set slot. The secondary slot is preferably positioned completely about the inner surface of the mortise. Preferably, the secondary slot has a curvilinear cross-sectional shape. Such a cross-sectional shape allows the compression material on the tenon to be easily inserted into, withdrawn, or passed through by the secondary slot.

In accordance with another aspect of the present invention, the tenon includes an inner chamber. The inner chamber is designed to retain an encapsulated adhesive and/or telescopically receive a peg attached to the base of the mortise. A tenon having an encapsulated adhesive releases the adhesive within the capsule when the capsule is ruptured by a peg in the base of the mortise or other object positioned at the base of the mortise designed to rupture the adhesive capsule.

In accordance with another aspect of the present invention, there is provided a tool for forming slots within the inner chamber of a mortise and/or polishing the mortise chamber. The tool is preferably designed of a ridge material such as steel. The tool is also preferably cylindrical in shape such that the tool can be easily rotated within the inner chamber of the mortise. The cross-sectional diameter of the tool is preferably equal to or slightly less than the cross-sectional diameter of the inner chamber of the mortise. Preferably positioned on the outer surface of the tool is a tool protrusion. The tool protrusion is preferably spherical or polygonal in shape and is mounted within a protrusion chamber located in the side of the tool. A set slot and/or secondary slot is formed within the inner chamber by inserting the tool into the chamber and subsequently rotating the tool. A side slot in the inner chamber can be formed by inserting and removing the tool in the chamber. The sides of the chamber can be polished by rotating the tool in the chamber.

It is the object of the present invention to provide a connecting element which can secure articles together such as furniture pieces.

It is another object of the present invention to provide a connecting element which uses a tenon, a mortise and a compression material to form a secure connection.

It is yet another object of the present invention to provide a connection element which includes slots in the mortise in combination with a compression material on a tenon to provide a connection between the mortise and tenon.

It is another object of the present invention to provide a connecting element which produces a tactual signal when the tenon is completely inserted to the mortise.

It is still a further object of the present invention to provide a connecting element which includes a water soluble adhesive to form a rigid and strong bond between the tenon and mortise.

It is still yet another object of the present invention to provide a side slot in the mortise to enhance the flow of a liquid in the mortise.

It is still another object of the present invention to provide a mortise having a secondary slot and a set slot to provide for preliminary assembly and final assembly of the connection.

It is another object of the present invention to provide a tenon having a capsulated adhesive and to introduce the adhesive in the mortise in a desired amount for proper adhesion of the tenon to the mortise.

It is another object of the present invention to provide a connection device which is simple and cost effective to design and provides for a strong and rigid connection.

It is another object of the present invention to provide a connection device which forms a clean and strong connection without the need for careful and expert assembly.

It is another object of the present invention to provide a connecting device which may be connected and unconnected to allow an operator to assemble and disassemble the article prior to finally setting the article in its final form.

It is still another object of the present invention to provide a connector for a blind side connection.

It is another object of the present invention to provide a tool for forming slots in the mortise inner chamber.

These and other objects and advantages will become apparent to those skilled in the art upon reading the following description taken together with accompanied drawings.

BRIEF DESCRIPTION OF THE DRAWINGS

Reference may now be made to the drawings, which only illustrate various embodiments that the invention may take in physical form and in certain parts and arrangements of parts wherein.

DETAILED DESCRIPTION OF THE PREFERRED EMBODIMENTS

Figures 1, 2:
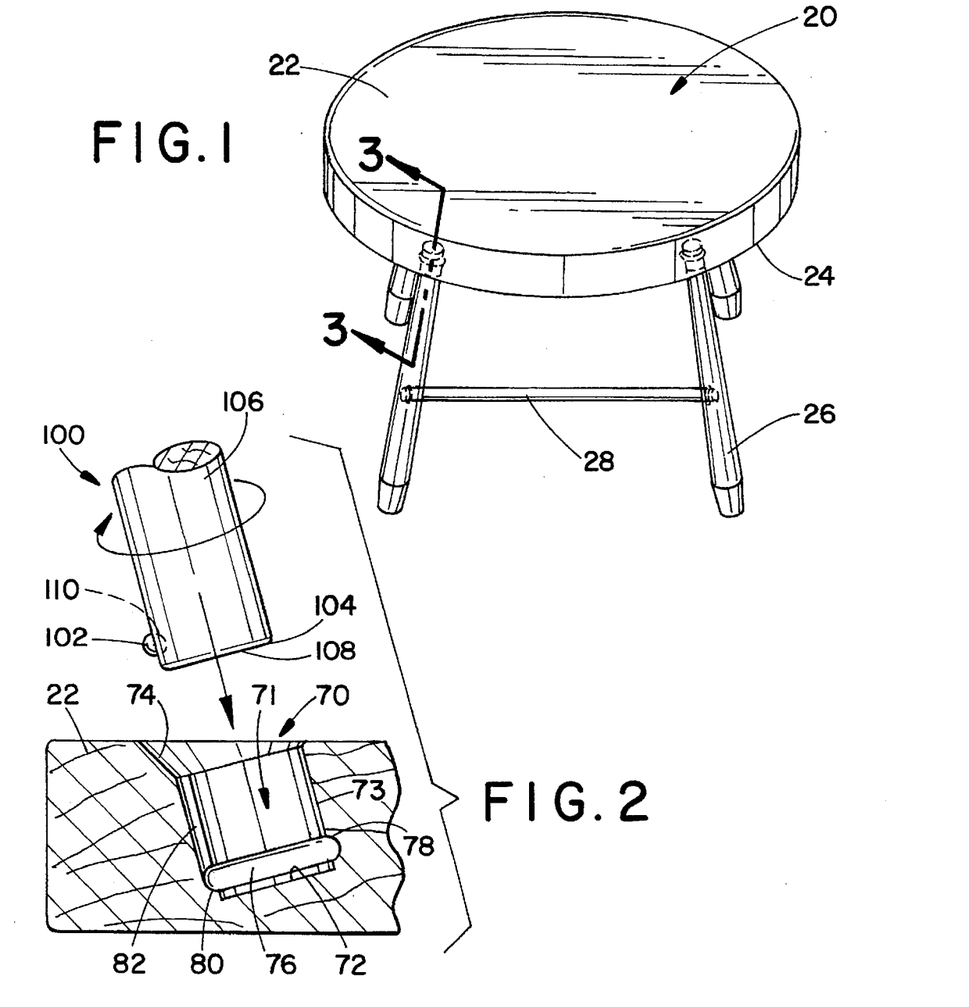
FIG. 1 is an elevation view of a stool which incorporates the use of the present invention.
FIG. 2 is an elevation view which illustrates the use of a tool which forms the unique mortise which is part of the present invention.

Referring now to the drawings, wherein the showings are for the purpose of illustrating the preferred embodiments of the invention only and not for the purpose of limiting the same, in FIG. 1 there is shown a stool 20 which includes legs 26 and support legs 28 connect between the legs to provide support and stability to the stool. Each leg 26 is inserted into the underside surface 24 of stool top 22 by inserting tenon 30 located on the end of each leg 24 into mortise 70 which is on the underside surface 24 of the stool top. Support leg 28 is connected in similar fashion to leg 26. Support leg 28 includes a tenon 30 at each end of the support leg. The tenon on the support leg is inserted into a mortise which is located on the side of the leg as illustrated in FIG. 1. The legs and support legs may be color coded to indicate proper assembly. Although all reference to the invention to this point has been directed to the assembly of stool 20, the use of a tenon and mortise to form a connection is equally applicable in other types of furniture and/or structures.

Figure 3:
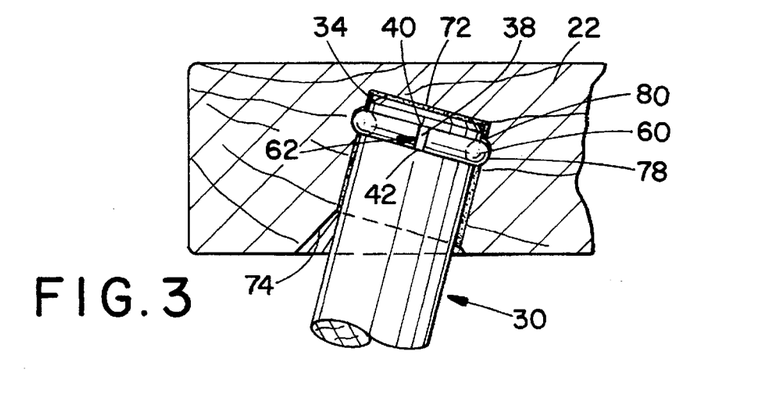
FIG. 3 is a cross-sectional elevation view taken along line 3—3 of FIG. 1.
Figure 7:
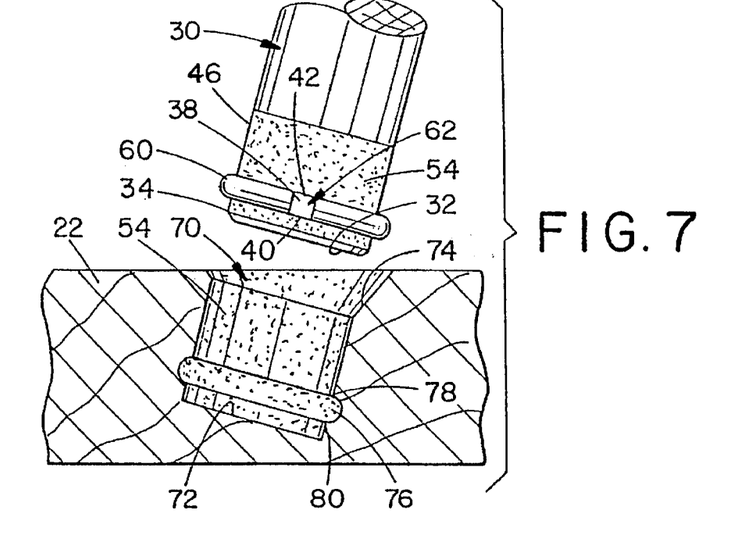
FIG. 7 illustrates the mortise and tenon of FIG. 3 prior to the tenon being inserted into the mortise.

Referring now to FIGS. 2, 3 and 7, mortise 70 includes a chamber 71 in underside surface 24 of stool top 22 and the side of leg 26. The mortise is formed by a common bore device which forms a generally cylindrically shaped chamber 71 of some pre-defined cross-sectional diameter. As shown in FIG. 2, the mortise chamber may be formed at an angle to the plane of underside surface 24 to cause legs 26 which are inserted into the stool top to be angled downwardly from the stool top to provide additional stability. However, it will be appreciated that the mortise chamber may be formed at any desired angle so that various types of connections may be properly formed. Mortise 70 also preferably includes a bevelled edge 74 to facilitate the insertion of tenon 30 into mortise 70. The bevelled edge can be formed by a common bevelling tool.

After the bore has formed the mortise chamber, the sides 73 and the base 72 of the mortise chamber are rough. The chamber is polished by inserting slot tool 100 into the chamber and rotating the slot tool one or more revolutions in the chamber to polish the sides and base of the chamber.

As illustrated in FIG. 2, slot tool 100 preferably includes a tool protrusion 102 located on tool side 106 which is spaced at some pre-defined distance from front edge 104. Tool protrusion 102 is preferably a hardened metal ball which is rigidly mounted in protrusion chamber 110. As slot tool 100 is inserted into mortise chamber 71, tool protrusion 102 forms a side slot 82. The side slot has a curvilinear cross-sectional shape as a result of the curvilinear shaped protrusion. As will be appreciated, the cross-sectional shape of the side slot may be polygonal or some other shape by selecting the appropriately shaped protrusion on the tool. When slot tool 100 is completely inserted into the chamber, slot tool 100 is rotated one or more revolutions within the chamber which results in tool side 106 polishing the sides 73 and tool front surface 108 polishing base 72. The rotation of slot tool 100 also forms set slot 76 in side 73 as tool protrusion 102 rotates about the perimeter of the chamber. It will be appreciated that a secondary slot can be formed, not shown, between the opening of chamber 71 and set slot 76 by rotating the tool one or more times after being only partially inserted into the chamber. The set slot and/or secondary slot preferably have a curvilinear cross-sectional shape. However, other shapes can be formed. Once the chamber has been properly polished by slot tool 100, the rotation of slot tool 100 is stopped and slot tool 100 is retracted from the chamber. An additional side slot 82 may be formed in the chamber when tool protrusion 102 is retracted from the chamber at a location other than when tool protrusion entered mortise 70. Although tool protrusion 102 has been described as being rigidly mounted in protrusion chamber 110, it will be appreciated that other sophisticated mechanisms may be employed in slot tool 100 to retract and un-retract tool protrusion 102 within protrusion chamber 110. Slot tool 100 is preferably a durable material such as carbon or stainless steel so that such a tool will properly finish mortise 70 irrespective of the type of wood used. It will further be appreciated that tool protrusion can be eliminated from slot tool 100 so that the tool only polishes chamber 71 without forming any set slots, secondary slots or side slots.

Referring now to FIGS. 3 and 7, tenon 70 is a cylindrically-shaped member which includes a cross-sectional diameter which is selected to be slightly less than the cross-sectional diameter of mortise chamber 71. This diameter selection does not produce the interference fit which is commonly employed when using dowels. The difference in cross-section diameter of the chamber and the tenon is small to minimize the space between side 46 of tenon 30 and side 73 of mortise 70. A too large of a space would result in the wobbling of stool 20 and/or an unsecured connection between mortise 70 and tenon 30. For example, a mortise chamber 71 having a cross-sectional diameter of 1.0 inch, the cross-sectional diameter of tenon 30 is preferably no more than 50 thousandth of an inch smaller and more preferably no more than about 15–20 thousandth of an inch smaller than the diameter of the chamber. Preferably, the cross-sectional diameter of mortise chamber 71 is about 0.005 to 0.02 inch greater than the cross-sectional diameter of tenon 30.

Figure 4:
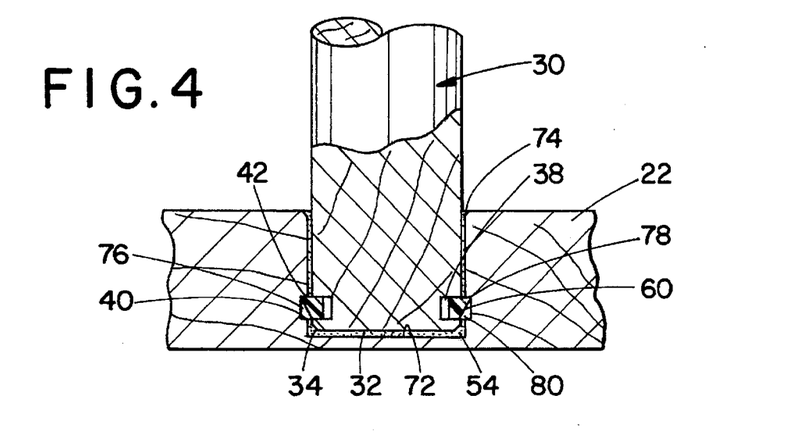
FIG. 4 is a cross-sectional elevation view which illustrates a modification of the invention of FIG. 3.
Figure 5:
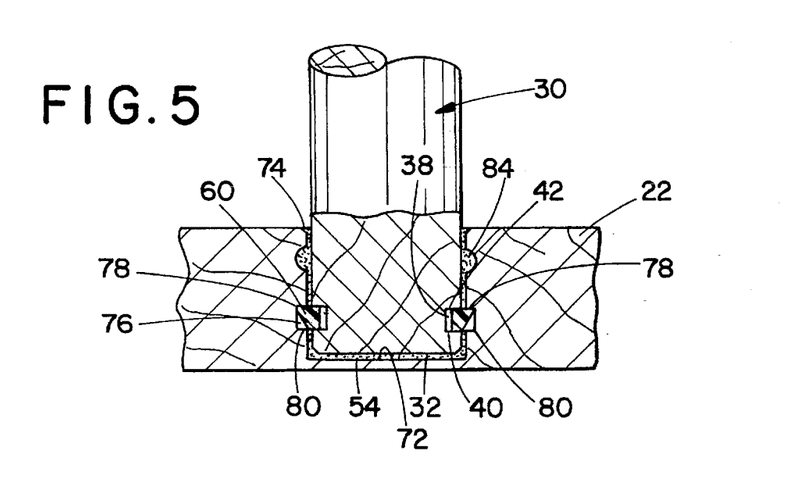
FIG. 5 is a cross-sectional elevation view of still another modification of the present invention.

Tenon 30 also includes a front face 32, a leading edge 34, and a groove 38. Leading edge 34 is preferably a bevelled surface so as to facilitate the insertion of tenon 30 into mortise 70. Groove 38 is an indention of some depth that encircles side 46 of tenon 30. Groove 30 preferably has a curvilinear cross-sectional shape as illustrated in FIGS. 3 and 7 or can have a polygonal cross-sectional shape as illustrated in FIGS. 4 and 5. Groove 38 includes a front edge 40 and a back edge 42.

Within groove 38 is inserted a compression material 60. Compression material 60 is preferably a TEFLON ring; however, materials such as polyethylene, polypropylene, nylon, rubber or other types of plastic material can be used. Compression material 60 is selected to both have an excellent memory and have the ability to be compressed when a peripheral force is acting on the compression material. The compression material is preferably elastomeric and has a durometer of about 70–150. A TEFLON ring is preferably used since such rings have excellent memory and are compressible under force. Furthermore, such a material provides for better sliding as the tenon is inserted into the mortise. Materials such as rubber tend to make it more difficult for the tenon to be properly inserted into the mortise. The diameter of the compression material is selected such that the inner diameter of the groove plus twice the cross-sectional diameter of the compression material is slightly greater than the cross-sectional diameter of the mortise. For example, for a mortise having a 1.0 inch cross-sectional diameter chamber, a tenon is selected to have a cross-sectional diameter of about 0.985 and an inner groove diameter of about 0.965 inch. The cross-sectional diameter of the compression material is selected to be at least about 0.018 inch such that the inner groove diameter plus twice the cross-sectional diameter of the compression material (0.965+2 (0.018)=1.001) is greater than the 1.0 inch cross-sectional diameter of the mortise chamber. As a result, the compression material forms a snug fit between the tenon and the mortise. As shown in FIGS. 3 and 7, the outer surface of compression material 60 is curvilinear in shape. The shape allows the tenon to be removed from the mortise prior to gluing as will be described in detail below. It will be appreciated that other dimensions for the compression material tenon and/or mortise chamber can be used. Further, the dimensions of the compression material are accordingly altered if an adhesive is coated on the mortise chamber and/or tenon prior to connecting such pieces together.

The compression of compression material 60 includes a compression space on compression material 60 as shown in FIG. 7 to allow the compression material 60 to be compressed into groove 38 as tenon 30 is inserted into mortise 70. The forces acting on compression material 60 as the tenon is inserted into the mortise cause the compression material center itself within the chamber so as to equally distribute the forces acting on the compression material. The centering of the compression material, in turn, causes the tenon to be centered in the chamber thereby ensuring that the tenon is properly positioned in the mortise chamber.

As shown in FIG. 3, the spacing of groove 38 from front edge 40 of tenon 30 is different from the spacing of slot 76 from base 72 of mortise 70. The spacing of groove 38 from front face 32 of tenon 30 is preferably greater than the spacing of slot 76 from base 72 of mortise 70. Preferably, such spacing differential is at least about 0.001 inch. This spacing difference only allows the outer edge of compression material 60 to partially enter slot 76 when the tenon is completely inserted into the mortise. For example, a tenon has a groove which is 0.005–0.02 inch deep, 0.011–0.020 inch exist between edges 40 and 42, and edge 40 is 0.155 inches from leading edge 34. A compression material is inserted completely in the groove having a diameter of 0.001–0.007 inches. The mortise has a set slot 76 wherein the interior edge 78 is 0.145 inch from base 72. As is evident from this arrangement, when the front face of the tenon contacts base 72, more than one half of the compression material peripheral edge has expanded into set slot 76. Since over half of the peripheral edge enters set slot 76, the compression material constantly attempts to completely move into set slot 76 thereby producing a force on tenon to move into the mortise. This arrangement creates a force of tenon 30 to be drawn into mortise 70 and to securely hold the tenon within the mortise.

The complete insertion of tenon 30 into mortise 70 also creates an audible sound or tactic signal to indicate that the tenon has been completely and properly inserted into mortise 70. The audible sound is created by compression material 60 expanding into slot 76 from a compressed state. A second method of creating the audible sound is to allow the top face of the leg to impact against the bottom of the mortise.

Referring now to FIG. 7, mortise 70 and/or tenon 30 may be precoated with a re-wettable adhesive 54. Preferably, the adhesive is applied to the mortise and tenon. The adhesive is applied to the mortise and/or tenon as a very thin coating such as 0.0005 to 0.005 inch. Preferably, the coating thickness is less than 10 thousandth of an inch and more preferably between 1–4 thousandth of an inch. The application of the adhesive to the tenon and mortise protects the tenon and mortise from moisture depletion or moisture saturation. When wooden articles are shipped, the articles are typically unassembled. During shipping, the ambient environment may be unduly dry or unduly humid. Dry environments cause the exposed cross grains on the mortise and tenon to contract and crack. Humid environments cause the exposed mortise and tenon to swell. As a result of the contraction and/or swelling of the mortise and tenon, once the articles have arrived at their final destination, the tenon and mortise may not properly fit together and/or may be damaged. The thickness of the re-wettable adhesive is selected to ensure that the desired moisture content of the mortise and tenon is sealed by the adhesive. However, the thickness of the adhesive is controlled so as not to reduce the inner diameter of mortise 70 and/or increase the cross-sectional diameter of tenon 30 to a point wherein tenon 30 cannot be inserted into mortise 70. Finally, thickness of the glue is selected so that once tenon 30 is inserted into mortise 70, the adhesive can be completely re-wetted by the addition of liquid and to further allow any excess liquid to be absorbed by the mortise and/or tenon which would result in their respective swelling. The swelling of the mortise and tenon results in a more secure connection between the mortise and tenon.

The adhesive is preferably a non-toxic, polyvinyl acetate derivative such as a vinyl acetate homolymer and/or a polyvinyl acetate having a viscosity of preferable about 900–1200 cps at a temperature of about 25° C. so that it easily spreads, and contains about 40–50% solids and more preferably about 4.0–6.0 and more preferably about 45–47% solids and has a pH of about 4.5–5.2. Although such glue is clear in color, a color additive may be added to the glue so as indicate to the assembler where the glue is located.

The assembly of stool 20 will now hereinafter be described. Stool 20 is assembled by first inserting the four legs 26 into the four mortises located in underside surface 24 of stool top 22. The glue on the tenon and mortise may be color coded so as to indicate which leg tenon should be inserted into the respective mortise. The bevelled edge on tenon 30 and the bevelled surface on mortise 70 facilitates the insertion of the tenon into the mortise. As tenon 30 is continued to be inserted into mortise 70, compression material 60 is compressed into slot 76 by the side walls of the mortise chamber. The assembler receives a tactual signal when tenon 30 is completely inserted into mortise 70 as the compression material expands into slot 76 of mortise 70. As shown in FIG. 3, compression material 60 does not completely enter slot 76 thereby creating a force on tenon 30 to be directed into mortise 70. Compression material 60 also ensures that tenon 30 is properly centered in mortise 70. Once the legs have been properly inserted in stool top 22, support legs 28 are attached between the respective legs to provide stability and additional support to stool 20. The tenon on the support legs and the mortise and the legs can be color coded to guide the assembler during assembly. The tenon on support legs 26 is inserted into the mortise on support leg 28 in the same fashion as the legs are inserted into stool top 22 as described above.

Once all the parts of the stool have been assembled, the assembler can double check to make sure all the components have been properly pieced together. If any of the pieces have been incorrectly assembled, the legs can be removed from stool top 22 and/or the support legs can be removed from leg 26 by the assembler removing the tenon of the respective part from its respective mortise. Because the outer surface of compression material 60 is curvilinear in shape, the removal of tenon 30 from mortise 70 causes the compression material to re-compress into slot 76 thereby allowing the user to separate the desired pieces. Once all the components of stool 20 have been properly assembled, the assembler applies a liquid such as water to all the tenon-mortise connections to re-wet the re-wettable adhesive. The liquid applied to the mortise naturally enters into the mortise by a wicking action. Side slot 82 and bevelled edge 74 also facilitate in the liquid entering the chamber of the mortise. A sufficient amount of liquid is added to the mortise to completely wet all the re-wettable adhesive on the tenon and mortise. The liquid, in addition to re-wetting the adhesive, penetrates into the wood grain of the mortise and tenon thereby causing these pieces to expand. Expansion of the tenon and the mortise causes any space between the tenon and mortise to further close. Prior to the adhesive completely drying, the stool is easily leveled by the assembler setting the stool on its four legs and subsequently sitting on stool top 22. The weight of the assembler adjusts all the components of the stool in the final proper position. The adhesive is then left to dry thus forming the completed stool as illustrated in FIG. 1.

Figure 8:
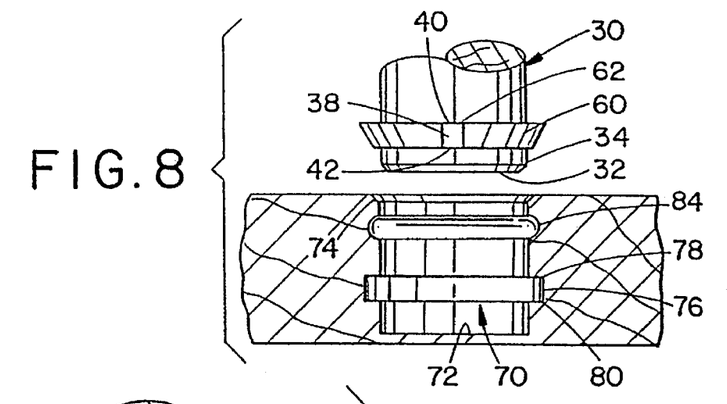
FIG. 8 is a cross-sectional elevation view of a mortise and tenon as illustrated in FIG. 5 prior to the tenon being inserted into the mortise; and, FIG. 9 is a cross-sectional elevation view of a tenon and mortise as shown in FIG. 6 prior to the tenon being inserted into the mortise.

Referring now to FIGS. 4, 5 and 8, the groove and compression material configuration on the tenon and the slot configuration on the mortise may be slightly modified to provide another type of secure blind side connection between a tenon and mortise. As illustrated in FIG. 8, tenon 30 includes a groove 38 wherein the cross-section of the groove is rectangular in shape. The tenon includes a front edge which is bevelled. A compression material 60 is inserted into groove 38. The diameter of the compression material is selected to be larger than the cross-sectional diameter of the mortise chamber. The compression material has a wedge like cross-sectional profile wherein the widest part of the wedge rests against back edge 42 and the narrowest part of the wedge rests against front edge 40. The compression material is preferably made up of a hard plastic which can be compressed under pressure and further has a memory so as to flex back to its original position once the force acting on the compression material has been reduced or eliminated. Preferably, the compression material is made up of polyethylene or polypropylene. Such materials are hard yet have an excellent memory upon compression. Compression material 60 includes a compression Space to allow the compression material to collapse within groove 38 when the tenon is inserted into the mortise chamber.

Referring now to FIG. 4, mortise 70 includes a slot 76 which has a generally rectangular cross-sectional profile. Set slot 76 includes a flat interior edge 78 and a flat posterior edge 80. Set slot 76 is positioned at a distance from base 72 of mortise 70 which is greater than the distance of groove 38 from front end 40 of tenon 30. This space relationship allows compression material 60 to completely enter slot 76 of mortise 70 as illustrated in FIG. 4. Alternatively, the mortise may not have a base to allow the tenon to move into the mortise until the compression material enters set slot 76. Tenon 30 is inserted into mortise 70 by directing the front face 32 of tenon 30 into mortise 70. The bevelled edges on the mortise and the tenon facilitate in the initial insertion of the tenon into the mortise. As the tenon is continued into the mortise, compression material 60 is compressed by sides 73 of mortise 70 thereby causing the compression material to contract into groove 38. Compression space 62 allows the compression material 60 to compressed within groove 38. The tenon is continued into mortise 70 until the assembler audibly detects a tactual signal caused by compression material 60 expanding into set slot 76.

Once compression material has expanded in the set slot 76, tenon 30 cannot be removed from mortise 70. This locking effect is caused by the broad flat base of the compression material positioned adjacent to the flat surface of interior edge 78 in set slot 76, thereby preventing the compression material from re-compressing into groove 38 when the assembler attempts to pull tenon 30 from mortise 70. The thinner flat side of the compression material is positioned adjacent to the flat posterior edge 80 of set slot 76 thereby securing compression material 60 in set slot 76 to further prevent removal of tenon 30 from mortise 70.

Once the tenon has been properly inserted into the mortise, the tenon is rigidly secured in the mortise by adding a liquid adhesive such as wood glue around the edges of the mortise. The liquid glue wicks into the spaces between the tenon and mortise thereby securing the tenon to the mortise. Alternatively or in addition, a liquid glue can be placed into the base 72 of mortise 70 prior to inserting tenon 30. As tenon 30 is inserted into mortise 70, the glue at the base of 72 is forced up along the sides of the mortise and tenon. Alternatively, the mortise and tenon can include a re-wettable adhesive which can be re-wetted once the tenon has been properly inserted into mortise 70. Although not shown, a side groove may be included in the mortise to improve the wicking affect into the mortise.

FIG. 5 illustrates a modification of the blind side connector of FIG. 4. In FIG. 5, the mortise includes a secondary slot 84. The cross-sectional area of the secondary slot is generally curvilinear in shape. The secondary slot is designed to be used as a preliminary assembly point of the tenon into the mortise. As the tenon is inserted into mortise 70, the compression material is maintained in its compressed state until entering secondary slot 84. Upon entering secondary slot 84, a tactual sound is made as the compression material expands into secondary slot 84. Due to the curvilinear cross-section of secondary slot 84, tenon 30 can be removed from mortise 70 if the pieces have been improperly assembled. A retraction force applied to tenon 30 will cause compression to material 60 to re-collapse within groove 30 as the outer edge of compression material 60 is forced back into groove 38 by the curvilinear design of secondary slot 84. Once the assembler has determined all the pieces are correctly assembled, the assembler moves the tenon completely into the mortise until compression material 60 expands into slot 76. As discussed above, once compression material 60 is positioned into slot 76, tenon 30 cannot be removed from mortise 70. Liquid adhesives or re-wettable adhesives may be used to rigidly secure the tenon to the mortise.

Figure 6:
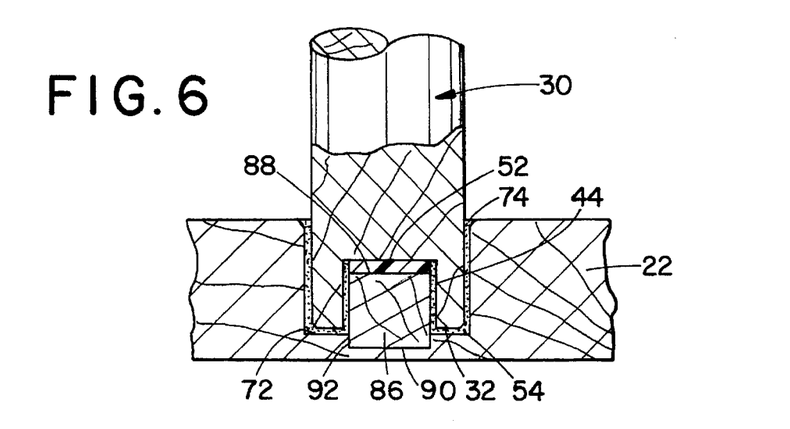
FIG. 6 is a cross-sectional elevational view of still yet another modification of the present invention.
Figure 9:
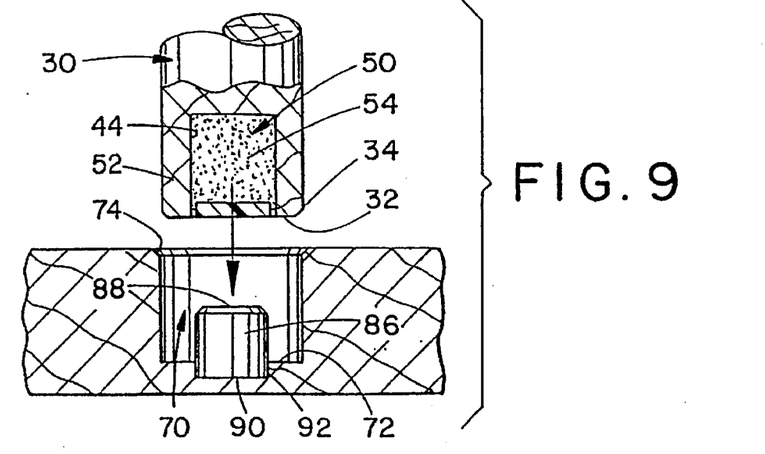

Referring now to FIGS. 6 and 9, a further embodiment of the tenon and mortise design for a blind side connection is disclosed. Referring now to FIG. 9, tenon 30 includes a front face 32 and a leading edge 34 which is preferably bevelled. Extending from the front face and into the interior of tenon 30 is an inner chamber 44. Inner chamber 44 preferably includes a circular cross-sectional shape and is designed to hold glue capsule 50. Within glue capsule 50 is contained a liquid wood glue 54. At the opening of glue capsule 50 is a capsule lid 52 which is designed to break open when a sufficient force is applied to the capsule lid. As shown in FIG. 9, mortise 70 includes a bevelled edge 74 and a base 72. Mounted in base 72 is a base peg 86. Base peg 86 includes a peg front face 88 and preferably a bevelled edge. Base peg 86 may be an integrated part of mortise 70 or inserted into a peg hole 92 which is cut into the base 72 of mortise 70. As shown in FIG. 9, base peg 86 is secured into peg hole 92 by inserting back face 90 into the peg hole and securing the base peg in the peg hole by an adhesive nail, screw, etc. Tenon 30 is secured into mortise 70 by directing the front face 32 of tenon 30 into mortise 70. The tenon is continued to be inserted into mortise 70 until capsule lid 52 engages base peg 86. Preferably, base peg 86 is positioned in base 72 so as to align itself with capsule lid 52. Furthermore, the cross-sectional diameter of base peg 86 is selected to be equal to or slightly less than the cross-sectional diameter of capsule lid 52. The user completes the assembly of tenon 30 into mortise 70 by applying a downward force on tenon 30 which in turn causes front face 88 of peg 86 to rupture capsule lid 52 on glue capsule 50. Once the capsule lid 52 is ruptured, glue 54 within glue capsule 50 flows from the glue capsule into the mortise and around the sides of tenon 30. Tenon 30 is completely inserted into mortise 70 when capsule lid 52 engages the back of glue capsule 50 as illustrated in FIG. 6. Any excess glue which has flowed out of the mortise may be removed by the assembler prior to the excess glue setting. Once glue 54 has set, tenon 30 is rigidly secured into mortise 70.

The invention has been described with reference to a preferred embodiments and alternates thereof. It is believed that many modifications and alterations to the embodiments disclosed will readily suggest themselves to those skilled in the art upon reading and understanding the detailed description of the invention. It is intended to include all such modifications and alterations in-so-far as they come within the scope of the present invention.

We claim:

1. A connecting element comprising:
    a tenon having a leading edge, a front face and a peripheral surface, said peripheral surface including a groove adapted to receive a compression material having an outer edge, said groove having a depth and positioned at least partially around said peripheral surface and spaced from said leading edge, said compression material positioned in said groove; and a mortise having an opening for telescopically receiving said front face of said tenon, a generally uniform inner chamber and a base surface, said inner chamber having an interior surface and including a set slot adapted to at least partially receive said compression material and positioned in said interior surface and spaced from said opening, said space of said set slot from said base surface is less than said space of said groove from said leading edge.

2. A connecting element as defined in claim 1, wherein said tenon and said mortise inner chamber having generally circular cross-sectional shapes and cross-sectional diameters, said cross-sectional diameter of said mortise chamber being greater than the cross-sectional diameter of said tenon.

3. A connecting element as defined in claim 2, wherein the diameter of said inner chamber is up to about 0.05 inch greater than the diameter of said tenon.

4. A connecting element as defined in claim 3, wherein the diameter of said inner chamber is about 0.005–0.02 inch greater than the diameter of said tenon.

5. A connecting element as defined in claim 2, wherein said mortise includes a secondary slot and a set slot, said secondary slot spaced between said opening than said set slot.

6. A connecting element as defined in claim 2, wherein said outer edge of said compression material extends beyond said peripheral surface of said tenon.

7. A connecting element as defined in claim 6, wherein said compression material is a circular ring and said outer edge diameter being greater than the cross-sectional diameter of said mortise chamber.

8. A connecting element as defined in claim 7, wherein said diameter of said outer edge of said compression material is at least about 0.001 inch greater than the cross-sectional diameter of said mortise chamber.

9. A connecting element as defined in claim 8, wherein said diameter of said outer edge of said compression material is about 0.001–0.01 inch greater than the cross-sectional diameter of said tenon.

10. A connecting element as defined in claim 7, wherein said leading edge of said tenon is bevelled.

11. A connecting element as defined in claim 10, wherein said mortise opening is bevelled.

12. A connecting element as defined in claim 7, wherein said compression material includes a flexible material selected from the group consisting of polyethylene, polypropylene and TEFLON, said flexible material elastomeric and having a durometer of about 70–150.

13. A connecting element as defined in claim 12, wherein said leading edge of said tenon is bevelled.

14. A connecting element as defined in claim 13, wherein said mortise opening is beveled.

15. A connecting element as defined in claim 14, wherein said mortise includes at least one side slot in said inner chamber.

16. A connecting element as defined in claim 15, wherein said at least one side slot extends from said opening to said set slot.

17. A connecting element as defined in claim 16, wherein said inner cheer of said mortise is coated with an adhesive.

18. A connecting element as defined in claim 17, wherein said adhesive is a water soluble adhesive.

19. A connecting element as defined in claim 20, wherein said secondary slot includes arcuate edges.

20. A connecting element as defined in claim 18, wherein said mortise includes a secondary slot and a set slot, said secondary slot spaced between said opening and said set slot.

21. A connecting element as defined in claim 20, wherein said set slot includes a distal edge and a proximal edge wherein the proximal edge is positioned closest to said secondary slot, said proximal edge including a flat upper surface being generally perpendicular to the interior surface of said chamber.

22. A connector element as defined in claim 21, wherein said compression material is a flexible material having wedge-shaped cross-section, said wedge-shaped cross-section includes a sloped peripheral edge, a top and generally flat base.

23. A connector element as defined in claim 22, wherein said compression material positioned in said grooves in that said top of said compression material is positioned adjacent to said distal edge and said flat base of said compression material is positioned adjacent to said proximal edge.

24. A connecting element as defined in claim 23, wherein said flat base and said top of said compression material each have a diameter, the diameter of said flat base being greater than said diameter of said tenon.

25. A connecting element in claim 17, wherein said tenon is coated with an adhesive.

26. A connecting element as defined in claim 7, wherein said mortise opening is bevelled.

27. A connecting element as defined in claim 7, wherein said mortise includes at least one side slot in said inner chamber.

28. A connecting element as defined in claim 27, wherein said at least one side slot extends from said opening to said set slot.

29. A connecting element as defined in claim 7, wherein said mortise includes a secondary slot and a set slot, said secondary slot spaced between said opening and said set slot.

30. A connector as defined in claim 1, wherein said space of said set slot from said base surface is at least about 0.05 inch and said space of said groove from said leading edge is at least about 0.051 inch.

31. A connecting element as defined in claim 1, wherein said compression material is a circular ring.

32. A connecting element as defined in claim 1, wherein said compression material includes a material selected from the group consisting of rubber, metal, and plastic material.

33. A connecting element as defined in claim 32, wherein said plastic material is a flexible material selected from the group consisting of polyethylene and polypropylene.

34. A connecting element as defined in claim 33, wherein said plastic material is elastomeric and has a durometer of about 70–150.

35. A connecting element as defined in claim 32, wherein said compression material includes TEFLON.

36. A connecting element as defined in claim 1, wherein said inner cheer of said mortise is coated with an adhesive.

37. A connecting element as defined in claim 36, wherein said adhesive is a water soluble adhesive.

38. A connecting element as defined in claim 37, wherein said adhesive includes a water soluble substance selected from the group consisting of vinyl acetate homopolymer, polyvinyl acetate and mixtures thereof.

39. A connecting element as defined in claim 38, wherein said adhesive is a polyvinyl acetate adhesive having a viscosity of about 900–1100 cps @ 25° C., a pH of about 4.0–6.0 and a solid content of about 40–50 weight percent.

40. A connecting element as defined in claim 39, wherein said adhesive has a generally uniform thickness of about 0.0005 to 0.005 inch.

41. A connecting element in claim 40, wherein said tenon is coated with an adhesive.

42. A connecting element in claim 1, wherein said tenon is coated with an adhesive.

43. A connecting element as defined in claim 42, wherein said adhesive is a water soluble adhesive.

44. A connecting element as defined in claim 1, wherein said mortise includes a secondary slot and a set slot, said secondary slot spaced between said opening than said set slot.

45. A connecting element as defined in claim 44, wherein said secondary slot includes arcuate edges.

46. A connecting element as defined in claim 44, wherein said set slot includes a distal edge and a proximal edge wherein the proximal edge is positioned closest to said secondary slot, said proximal edge including a flat upper surface being generally perpendicular to the interior surface of said chamber.

47. A connector element as defined in claim 46, wherein said compression material is a flexible material having wedge-shaped cross-section, said wedge-shaped cross-section includes a sloped peripheral edge, a top and generally flat base.

48. A connecting element as defined in claim 1, wherein said outer edge of said compression material extends beyond said peripheral surface of said tenon.

49. A connecting element as defined in claim 48, wherein said compression material is a circular ring.

50. A connecting element as defined in claim 9, wherein said outer edge has a diameter which is greater than the cross-sectional diameter of said mortise chamber.

51. A connecting element as defined in claim 50, wherein said diameter of said outer edge of said compression material is at least about 0.001 inch greater than the cross-sectional diameter of said mortise chamber.

52. A connecting element as defined in claim 51, wherein said diameter of said outer edge of said compression material is about 0.001–0.01 inch greater than the cross-sectional diameter of said tenon.

53. A connecting element as defined in claim 50, wherein said compression material includes a flexible material selected from the group consisting of polyethylene, polypropylene and TEFLON, said flexible material is elastomeric and having a durometer of about 70–150.

54. A connecting element as defined in claim 53, wherein said leading edge of said tenon is beveled.

55. A connecting element as defined in claim 54, wherein said mortise opening is beveled.

56. A connecting element as defined in claim 55, wherein said mortise includes at least one side slot in said interior chamber.

57. A connecting element as defined in claim 56, wherein said mortise includes a secondary slot and a set slot, said secondary slot spaced between said opening than said set slot.

58. A method of connecting comprising:
 (a) providing a tenon having a leading edge, a front face, a peripheral surface and a cross-sectional diameter, said peripheral surface including at least one groove circumferentially positioned about said peripheral surface and spaced from said leading edge;
 (b) providing a compression material having an outer edge and an outer edge diameter,
 (c) positioning said compression material in said groove, said outer edge diameter of said compression material greater than said cross-sectional diameter of said tenon;
 (d) providing a mortise including an opening having a cross-sectional diameter larger than said tenon to telescopically receive said front face of said tenon and a generally uniform inner chamber, said diameter of said opening less than said outer edge diameter of said compression material, said inner chamber having an interior surface which includes a set slot circumferentially positioned about said interior surface and spaced from said opening;
 (e) positioning said front face of said tenon into said opening of said mortise;
 (f) connecting together said tenon and said mortise by moving said tenon into said inner chamber of said mortise and compressing said compression material between said tenon and said mortise at least until said compression material on said tenon at least partially enters said set slot; and
 (g) applying a water soluble adhesive to said tenon prior to said connecting together step.

59. A method as defined in claim 58, including the step of applying a re-wettable adhesive to said interior chamber of said mortise prior to said connecting together step.

60. A method as defined in claim 59, including the step of rigidly connecting together said tenon and said mortise by applying a liquid to said tenon and said mortise opening in an amount to re-wet said adhesive.

61. A method as defined in claim 60, including the step of rigidly connecting together said tenon and said mortise by applying a liquid to said tenon causing said tenon and said mortise to swell.

62. A method of connecting comprising:
 (a) providing a tenon having a leading edge, a front face, a peripheral surface and a cross-sectional diameter, said peripheral surface including at least one groove circumferentially positioned about said peripheral surface and spaced from said leading edge;
 (b) providing a compression material having an outer edge and an outer edge diameter,
 (c) positioning said compression material in said groove, said outer edge diameter of said compression material greater than said cross-sectional diameter of said tenon;
 (d) providing a mortise including an opening having a cross-sectional diameter larger than said tenon to telescopically receive said front face of said tenon and a generally uniform inner chamber, said diameter of said opening less than said outer edge diameter of said compression material, said inner chamber having an interior surface which includes a set slot circumferentially positioned about said interior surface and spaced from said opening;
 (e) positioning said from face of said tenon into said opening of said mortise;
 (f) connecting together said tenon and said mortise by moving said tenon into said inner chamber of said mortise and compressing said compression material between said tenon and said mortise at least until said compression material on said tenon at least partially enters said set slot; and
 (g) applying a re-wettable adhesive to said interior chamber of said mortise prior to said connecting together step.

63. A method of connecting comprising:
(a) providing a tenon having a leading edge, a front face, a peripheral surface and a cross-sectional diameter, said peripheral surface including at least one groove circumferentially positioned about said peripheral surface and spaced from said leading edge;
(b) providing a compression material having an outer edge and an outer edge diameter,
(c) positioning said compression material in said groove, said outer edge diameter of said compression material greater than said cross-sectional diameter of said tenon;
(d) providing a mortise including an opening having a cross-sectional diameter larger than said tenon to telescopically receive said front face of said tenon and a generally uniform inner chamber, said diameter of said opening less than said outer edge diameter of said compression material, said inner chamber having an interior surface which includes a set slot circumferentially positioned about said interior surface and spaced from said opening, said space between said chamber base surface and said set slot being less than the space between said tenon leading edge and said tenon groove,
(e) positioning said front face of said tenon into said opening of said mortise; and
(f) connecting together said tenon and said mortise by moving said tenon into said inner chamber of said mortise and compressing said compression material between said tenon and said mortise at least until said compression material on said tenon at least partially enters said set slot.

64. A method as defined in claim 63, wherein said connecting together being indicated by a tactile signal and audible sound produced by the compression material at least partially entering said set slot.

65. A method as defined in claim 63, including the step of rigidly connecting together said tenon and said mortise by applying a liquid to said tenon and said mortise opening in an amount to re-wet an adhesive.

66. A method as defined in claim 63, including the step of rigidly connecting together said tenon and said mortise by applying a liquid to said tenon causing said tenon to swell.

67. A connecting element comprising:
tenon having a leading edge, a front face and a peripheral surface, said peripheral surface including a groove adapted to receive a compression material, said groove positioned at least partially about said peripheral edge and spaced from said leading edge;
a mortise having an opening for telescopically receiving said front face of said tenon, an inner chamber and a base surface, said inner chamber including an interior surface and a set slot positioned in said interior surface, said set slot spaced from said base surface and adapted to at least partially receive said compression material, said space of said set slot from said base surface less than said space of said groove from said leading edge and,
said compression material comprising of a compressible material position in said groove and extending beyond said peripheral surface of said tenon and adapted to compress when interacting with said interior surface of said mortise and to at least partially decompress when at least partially received in said set slot.

68. A connecting element as defined in claim 67, wherein said tenon and said mortise inner chamber having generally circular cross-sectional shapes and cross-sectional diameters, said cross-sectional diameter of said mortise chamber being greater than the cross-sectional diameter of said tenon.

69. A connecting element as defined in claim 68, wherein the diameter of said inner chamber is up to about 0.05 inch greater than the diameter of said tenon.

70. A connecting element as defined in claim 69, wherein said compression material is a circular ring and said outer edge diameter being greater than the cross-sectional diameter of said mortise chamber.

71. A connecting element as defined in claim 70, wherein said compression material includes a material selected from the group consisting of rubber, metal, TEFLON and plastic material.

72. A connecting element as defined in claim 71, wherein said compression material includes a flexible material selected from the group consisting of polyethylene, polypropylene and TEFLON, said flexible material elastomeric and having a durometer of about 70–150.

73. A connecting element as defined in claim 72, wherein said mortise includes at least one side slot in said interior chamber extending from said opening to said set slot.

74. A connecting element as defined in claim 73, wherein said inner surface of said mortise and said peripheral surface of said tenon at least partially coated with a water soluble adhesive.

75. A connecting element as defined in claim 74, wherein said mortise includes a secondary slot and a set slot, said secondary slot spaced between said opening than said set slot.

76. A connecting element comprising:
a tenon having a leading edge, a front face and a peripheral surface, said peripheral surface including a groove adapted to receive a compression material, said groove positioned at least partially about said peripheral edge and spaced from said leading edge;
a mortise having an opening for telescopically receiving said front face of said tenon, an inner chamber and a base surface, said inner chamber including an interior surface and a set slot positioned in said interior surface, said set slot spaced from said base surface and adapted to at least partially receive said compression material;
said compression material comprising of a compressible material position in said groove and extending beyond said peripheral surface of said tenon and adapted to compress when interacting with said interior surface of said mortise and to at least partially decompress when at least partially received in said set slot; and
said inner surface of said mortise and said peripheral surface of said tenon at least partially coated with a water soluble adhesive.

* * * * *